(12) United States Patent
Sakashita et al.

(10) Patent No.: US 9,563,298 B2
(45) Date of Patent: Feb. 7, 2017

(54) TOUCH PANEL FABRICATING METHOD AND CONDUCTIVE-ELECTRODED FILM

(71) Applicant: NISSHA PRINTING CO., LTD., Kyoto-shi, Kyoto (JP)

(72) Inventors: Asako Sakashita, Kyoto (JP); Ryohei Nagase, Kyoto (JP)

(73) Assignee: NISSHA PRINTING CO., LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/407,833

(22) PCT Filed: Apr. 18, 2013

(86) PCT No.: PCT/JP2013/061495
§ 371 (c)(1),
(2) Date: Dec. 12, 2014

(87) PCT Pub. No.: WO2013/187123
PCT Pub. Date: Dec. 19, 2013

(65) Prior Publication Data
US 2015/0185888 A1    Jul. 2, 2015

(30) Foreign Application Priority Data
Jun. 14, 2012   (JP) .................. 2012-134320

(51) Int. Cl.
*G06F 3/041* (2006.01)
*G06F 3/044* (2006.01)

(52) U.S. Cl.
CPC ............... *G06F 3/041* (2013.01); *G06F 3/044* (2013.01); *G06F 2203/04103* (2013.01); *Y10T 29/49105* (2015.01)

(58) Field of Classification Search
CPC ................. G06F 3/03547; G06F 3/044; G06F 2203/04103; G06F 3/041; Y10T 29/49002; Y10T 29/49105; B32B 2457/208; G02F 1/13338
See application file for complete search history.

(56) References Cited

U.S. PATENT DOCUMENTS 6,280,552 B1 * 8/2001 Bottari .................... G06F 3/045
156/230
8,633,897 B2 * 1/2014 Endo ...................... G06F 3/045
345/173

(Continued)

FOREIGN PATENT DOCUMENTS

JP    2007-012354 A    1/2007
JP    2007-279819 A    10/2007

(Continued)

OTHER PUBLICATIONS

PCT, "International Search Report for International Application No. PCT/JP2013/061495".

*Primary Examiner* — Michael J Jansen, II
(74) *Attorney, Agent, or Firm* — Manabu Kanesaka

(57) ABSTRACT

A method of fabricating a touch panel includes the steps of forming the touch panel from a forming material and a film with a conductive electrode formed with a conductive electrode region constituting a touch surface on a substrate film, and deforming the film with the conductive electrode and integrating with the forming material to fabricate the touch panel with a curved touch surface. The conductive electrode region in the film with the conductive electrode includes a discontinuous part for controlling a breakage of the conductive electrode region so that during a deformation of the film with the conductive electrode, a breakage occurs at one portion of a deformed part of the conductive electrode region and the conductive electrode region retains conductivity at two points sandwiching the deformed part therebetween.

3 Claims, 4 Drawing Sheets

(56) References Cited

U.S. PATENT DOCUMENTS

| | | | |
|---|---|---|---|
| 8,808,483 B2* | 8/2014 | Sung | B32B 17/10174 156/214 |
| 9,092,095 B2* | 7/2015 | Nakanishi | G06F 3/044 |
| 2008/0042997 A1* | 2/2008 | Endo | G06F 3/045 345/176 |
| 2009/0085892 A1* | 4/2009 | Ishikura | B60K 35/00 345/174 |
| 2009/0314550 A1* | 12/2009 | Layton | G06F 3/044 178/18.03 |
| 2010/0066683 A1* | 3/2010 | Chang | B32B 37/025 345/173 |
| 2010/0103138 A1* | 4/2010 | Huang | G06F 3/044 345/174 |
| 2010/0245246 A1* | 9/2010 | Rosenfeld | G06F 3/03543 345/163 |
| 2010/0265210 A1* | 10/2010 | Nakanishi | G09G 5/18 345/174 |
| 2011/0031041 A1* | 2/2011 | Bulea | G06F 3/044 178/18.06 |
| 2011/0248954 A1* | 10/2011 | Hamada | G06F 3/03547 345/174 |
| 2011/0273383 A1* | 11/2011 | Jeon | G06F 3/044 345/173 |
| 2012/0019449 A1* | 1/2012 | Yilmaz | G06F 3/044 345/173 |
| 2012/0032916 A1* | 2/2012 | Enoki | G06F 3/044 345/174 |
| 2012/0098791 A1* | 4/2012 | Hamada | G06F 3/044 345/174 |
| 2012/0111479 A1* | 5/2012 | Sung | B32B 17/10174 156/102 |
| 2012/0249465 A1* | 10/2012 | Lin | G06F 3/041 345/173 |
| 2013/0335375 A1* | 12/2013 | Nishikawa | G06F 3/044 345/174 |
| 2014/0055958 A1* | 2/2014 | Hsu | B29C 45/14811 361/728 |
| 2014/0320756 A1* | 10/2014 | Shih | G06F 3/045 349/12 |
| 2014/0368761 A1* | 12/2014 | Lin | G06F 3/041 349/12 |
| 2015/0185888 A1* | 7/2015 | Sakashita | G06F 3/041 345/174 |
| 2015/0185889 A1* | 7/2015 | Nakamura | G06F 3/044 345/173 |
| 2016/0011689 A1* | 1/2016 | Kim | G06F 3/044 345/173 |
| 2016/0104558 A1* | 4/2016 | Chang | G06F 3/044 216/13 |

FOREIGN PATENT DOCUMENTS

| | | |
|---|---|---|
| JP | 2011-198686 A | 10/2011 |
| WO | 2011/142332 A1 | 11/2011 |
| WO | 2011/142333 A1 | 11/2011 |

* cited by examiner

TOUCH PANEL FABRICATING METHOD AND CONDUCTIVE-ELECTRODED FILM

CROSS-REFERENCES TO RELATED APPLICATIONS

The present application is National Phase of International Application No. PCT/JP2013/061495 filed Apr. 18, 2013, and claims priority from Japanese Application No. 2012-134320 filed Jun. 14, 2012.

TECHNICAL FIELD

The present invention relates to a method of fabricating a curved touch panel, specifically, a method of fabricating a touch panel by shaping a conductive-electroded film and combining the shaped film with a forming material. The present invention also relates to the conductive-electroded film.

BACKGROUND ART

In the conventional technology, capacitive touch panels having a curved touch surface have already been proposed (for example, those disclosed in PTL 1).

A conventional method of fabricating a touch panel employs a forming material and a conductive-electroded film manufactured by making, on a substrate film, a conductive electrode region for constituting a touch surface, and fabricates a touch panel by shaping the conductive-electroded film and combining the shaped film and the forming material. An example of the method of shaping a conductive-electroded film and combining the shaped film and a forming material includes the steps of laminating a conductive-electroded film on a flat forming material and shaping the flat laminate into a curved surface by vacuum and pressure forming.

Unfortunately, conventional conductive-electroded films employed for fabricating curved touch panels have posed a problem, that is, breakage of a conductive electrode on a curved part, i.e., extended or contracted part, of the film, which leads to the loss of conductivity in a single electrode region and poor yield of touch panels fabricated.

CITATION LIST

Patent Literature

PTL 1: Japanese Patent Publication Laid open 2007-279819

SUMMARY OF INVENTION

Technical Problem

The problem to be solved by the present invention relating to a method of fabricating a touch panel is providing a method of fabricating a curved touch panel by use of a flat conductive-electroded film, in which the conductivity of a single electrode region in the film is retained to complete the function of the resultant curved touch panel.

The problem to be solved by the present invention relating to the conductive-electroded film is manufacturing a conductive-electroded film, which retains the conductivity of a single electrode region in the film after the film is shaped into a curve.

Other problems to be solved by the present invention are apparently explained in the following description of the present invention.

Solution to Problem

A method of fabricating a touch panel according to one embodiment of the present invention includes steps of shaping a conductive-electroded film manufactured by making, on a substrate film, a conductive electrode region for constituting a touch surface, and combining the shaped conductive-electroded film with a forming material to fabricate a touch panel with a curved touch surface. In the embodiment, the conductive electrode region in the conductive-electroded film contains a discontinuous part for controlling the breakage of the conductive electrode region in the shaped conductive-electroded film in order to make the conductive electrode region break partially and retain the conductivity between two points on both sides of the shaped part of the conductive-electroded film.

A method of fabricating a touch panel according to a preferable embodiment of the present invention employs a conductive-electroded film which has a conductive electrode region made by applying an anchoring agent on a substrate film and laying a conductive material on the anchoring agent. The discontinuous part mentioned above can be formed by making a discontinuous layer of the conductive material or the anchoring agent.

A method of fabricating a touch panel according to another preferable embodiment of the present invention provides a touch panel having a three-dimensional shape of a spherical cap or hemisphere with a rim extending from the periphery of the base of the spherical cap or hemisphere. The conductive electrode region in the conductive-electroded film is circumscribed by a circle having a radius R and a center C. A discontinuous part is formed by making holes in the conductive electrode region included in an annulus between two concentric circles each having a radius ⅓ R or ⅔ R and the center C, and another discontinuous part is formed by making slits in the conductive electrode region included in an annulus between two concentric circles each having a radius ⅔ R or R and the center C. The slits may be parallel to the arc of circles having the center C.

A method of fabricating a touch panel according to another preferable embodiment of the present invention provides a touch panel having a three-dimensional shape of a spherical cap or hemisphere with a rim extending from the periphery of the base of the spherical cap or hemisphere. The conductive electrode region on the conductive-electroded film is circumscribed by a circle having a radius R and a center C; and the area of the discontinuous part per a unit area of the conductive electrode region included in the circle having the radius ⅓ R and the center C, which is represented by NCA-S, and the area of the discontinuous part per a unit area of the conductive electrode region included in the annulus between two concentric circles each having the radius ⅔ R or R and the center C, which is represented by NCA-L, satisfy the following equation (1).

$$NCA\text{-}S < NCS\text{-}L \qquad \text{Equation (1)}$$

A conductive-electroded film according to another embodiment of the present invention is intended to be combined with a forming material and employed for fabricating a touch panel having curved touch surface. In the embodiment, the conductive-electroded film is manufactured by making, on a substrate film, a conductive electrode region for constituting a touch surface of a touch panel, and a discontinuous part is made in the conductive electrode region for controlling the breakage of the conductive electrode region in shaped conductive-electroded film to make the conductive electrode region break partially and retain the conductivity between two points on both sides of the shaped part of the conductive-electroded film.

A conductive-electroded film according to a preferable embodiment of the present invention contains substrate film, a layer of an anchoring agent formed on the substrate film, and a layer of a conductive material laminated on the layer of the anchoring agent. The layer of the conductive material has a discontinuous part, which makes the discontinuous part in the conductive electrode region. Alternatively, the layer of the anchoring agent has a discontinuous part, which makes the discontinuous part in the conductive electrode region.

A conductive-electroded film according to another preferable embodiment of the present invention is fabricated into a touch panel having a three-dimensional shape of a spherical cap or hemisphere with a rim extending from the periphery of the base of the spherical cap or hemisphere. The conductive electrode region in the conductive-electroded film is circumscribed by a circle having a radius R and the center C. A discontinuous part is formed by making holes in the conductive electrode region included in an annulus between two concentric circles each having a radius ⅓ R or ⅔ R and the center C, and another discontinuous part is formed by making slits in the conductive electrode region included in an annulus between two concentric circles each having the radius ⅔ R or R and the center C. The slits may be parallel to the arc of circles having the center C.

A conductive-electroded film according to another preferable embodiment of the present invention is fabricated into a touch panel having a three-dimensional shape of a spherical cap or hemisphere with a rim extending from the periphery of the base of the spherical cap or hemisphere. The conductive electrode region in the conductive-electroded film is circumscribed by a circle having a radius R and the center C; and the area of the discontinuous part per a unit area of the conductive electrode region included in the circle having a radius ⅓ R and the center C, which is represented by NCA-S, and the area of the discontinuous part per a unit area of the conductive electrode region included in the annulus between two concentric circles each having the radius ⅔ R or R and the center C, which is represented by NCA-L, satisfy the following equation (1).

$$NCA\text{-}S < NCS\text{-}L \quad \text{Equation (1)}$$

The present invention, preferable embodiments of the present invention and the elements contained therein can be combined as far as possible to work the invention.

Advantageous Effects of Invention

The advantages of the method of fabricating a touch panel of the present invention includes fabrication of touch panels having deeper or more complicated curved shapes than that of conventional touch panels, because the discontinuous part in the conductive-electroded film controls the breakage of the electrode region to retain the conductivity of the electrode region after the conductive-electroded film is shaped into a curve.

The conductive-electroded film of the present invention is advantageous for fabricating touch panels having deeper or more complicated curved shapes than that of conventional touch panels, because the discontinuous part in the conductive-electroded film controls the breakage of the electrode region to retain the conductivity of the electrode region after the conductive-electroded film is shaped into a curve.

DESCRIPTION OF EMBODIMENT

The method of fabricating the touch panel and the conductive-electroded film according to the embodiments of the present invention are further described referring to the figures. Some of the figures are pattern diagrams containing magnification of some elements for easy understanding of the present invention. Thus some of the dimensions or dimensional ratio between elements may be different from that of actual touch panels and conductive-electroded films.

A number used as a sign may collectively represent a plurality of parts of the same kind, and alphabetical letters are sometimes added to such number for representing each of the parts. The dimensions, materials, forms and relative positions of the members and parts described in the working examples of the present invention merely explain the present invention and do not restrict the scope of the present invention unless otherwise specified.

Figure 1:
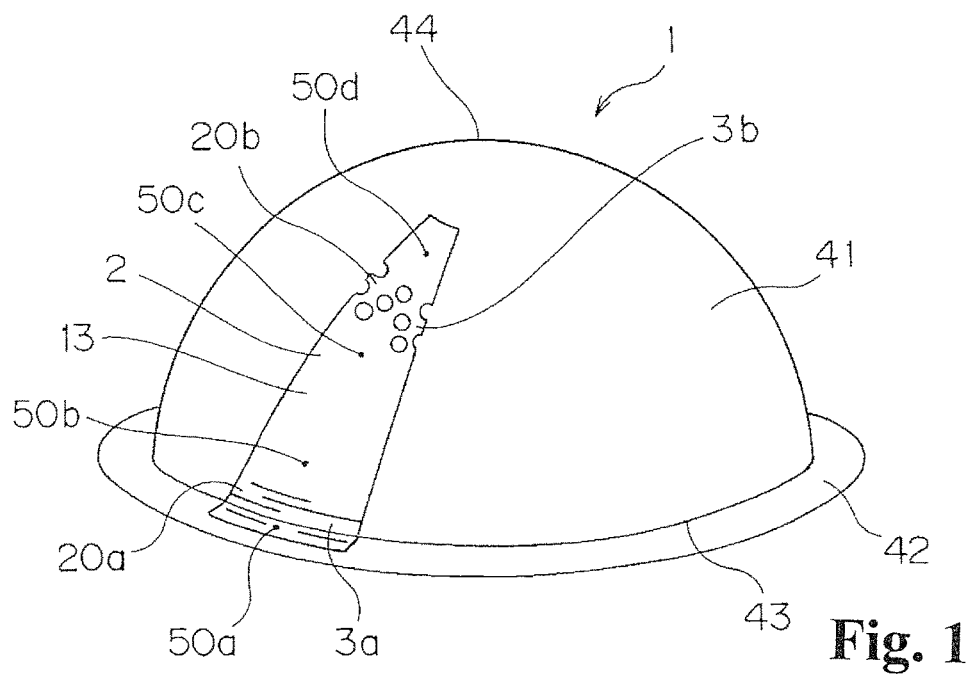
FIG. 1 is the illustrative diagram of a touch panel fabricated by the method of fabricating a touch panel of the present invention.

FIG. 1 is the illustrative diagram of a touch panel fabricated by the method of fabricating a touch panel of the present invention. FIG. 1 is a perspective view. The touch panel 1 has a three-dimensional shape consisting of a spherical cap 41 and a rim 42. The rim 42 extends from the base 43 of the spherical cap 41. The top 44 is the most distant point from the base 43.

The spherical cap 41 may be a hemisphere. The spherical cap of the present invention mentioned in the specification refers to a part of a sphere cut off by a plane. A preferable shape for a touch panel 1 is smaller one of two spherical caps made by cutting a sphere by a plane, because such shape do not require extremely deep drawing of a flat forming material and flat conductive-electroded film. The spherical cap 41 may be a hemisphere.

The rim 42 functions as a part for fixing the touch panel 1 onto a case or frame, and also as a part on which a wire outlet is made. The rim 42 should preferably be flat, and more preferably be flat and included in the plane extended from the base 43.

The three-dimensional shape of the touch panel 1 mentioned above is mere an example of the embodiments. The shape of the touch panels fabricated in the method of fabricating a touch panel of the present invention is not restricted within the scope of the shape, and includes, for example, a part of a spheroid, circular truncated cone, parallelepiped, hexahedron, curved profile, semicylinder, wave profile, and concavo-convex shape.

The touch panel 1 has a touch surface 2, the function of which is given by the conductive electrode region 13 on the conductive-electroded film. The conductive-electroded film is manufactured by laying a conductive electrode region on a substrate film.

The touch panel 1 is made of the conductive-electroded film and a forming material such as acrylic resin plate. The touch panel 1 is fabricated into a curved surface by laminating the conductive-electroded film on the forming material and shaping the laminate by vacuum and pressure forming.

For fabricating the touch panel 1 having an almost curved surface, whole of the conductive electrode region is extended in the vacuum and pressure forming. The shaped parts 3a and 3b are extended more than other parts. The shaped part 3a is adjacent to the rim 42. The shaped part 3b lies about the periphery of the spherical cap in a distance of ½h from the base 43 where h is the height from the base 43 to the top 44 of the spherical cap.

A discontinuous part 20a is included in the shaped part 3a of the conductive electrode region 13. The discontinuous part 20a can be explained as crack marks which lead the breakage of the conductive electrode region and controls the length of the breakage within a certain range.

The points 50a and 50b exist on a single conductive electrode region, and the shaped part 3a is located between the points 50a and 50b.

The electric conductivity between the points 50a and 50b is retained throughout breakage of the discontinuous part 20a under controlled conditions and fabrication of the touch panel 1 in a forming process.

A discontinuous part 20b is also included in the shaped part 3b of the conductive electrode region 13. The discontinuous part 20b also has the function of crack marks the same as the discontinuous part 20a mentioned above.

The points 50c and 50d exist on a single conductive electrode region, and the shaped part 3b is located between the points 50c and 50d.

The electric conductivity between the points 50c and 50d is retained throughout breakage of the discontinuous part 20b under controlled conditions and fabrication of the touch panel 1 in a forming process.

In an example of the dimensions of the touch panel 1, the spherical cap 41 has a radius of 130 mm and the rim 42 has a width of 25 mm.

Figure 2A:
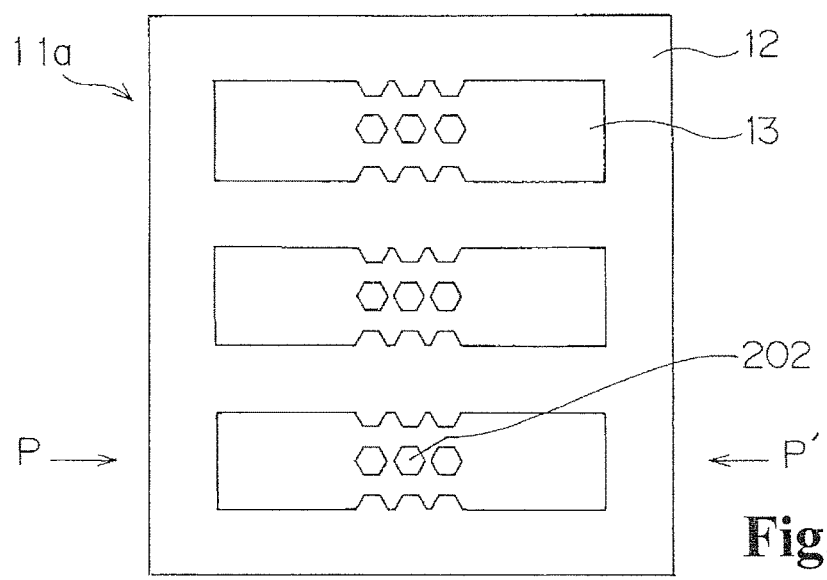
FIG. 2 is the illustrative diagram of a first conductive-electroded film.
Figure 2B:
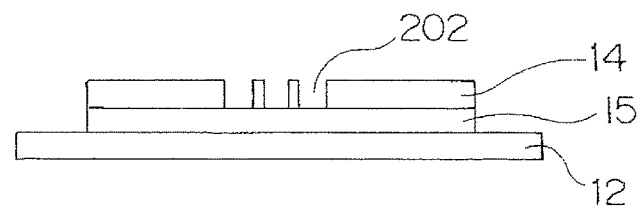

FIG. 2 is the illustrative diagram of a first conductive-electroded film. FIG. 2(a) is a plan view and FIG. 2(b) is a cross-sectional view taken along the plane indicated by the arrows P and P'.

The first conductive-electroded film 11a is manufactured by applying an anchoring agent 15 on a substrate film 12 and laying a conductive material 14 on the anchoring agent 15 to make a conductive electrode region 13. The conductive electrode region 13 is a main part of the touch surface of a touch panel fabricated from the first conductive-electroded film 11a.

The conductive material 14 is patterned into three conductive electrode regions 13, each having hexagonal holes 202 to make the thin layer of the conductive material 14 discontinuous. The discontinuous parts having the holes 202 control the breakage of the conductive electrode region.

The first conductive-electroded film 11a shown in FIG. 2 contains thin layer of an anchoring agent 15 under the conductive material layer and at the bottom of the holes 202. The anchoring agent may not exist or may partially exist at the bottom of the holes 202.

The substrate film includes films of resins such as acrylate, polycarbonate, polyester, polybutylene terephthalate, polypropylene, polyamide, polyurethane, polyvinyl chloride, polyvinyl fluoride and polyimide.

The thickness of the substrate film can be determined within a range from 25 μm to 300 μm, preferably from 100 μm to 200 μm. A substrate film thinner than 25 μm has insufficient strength and may break in a process of shaping the film into a curve to cause difficult handling, while a substrate film thicker than 300 μm is too rigid to be processed.

Thermoplastic resins such as polycarbonate resin are preferable for the substrate film owing to their good processability in forming a curved shape.

The conductive material includes carbon nanotube (CNT), metal nanowire such as silver nanowire, fine particles of polyethylenedioxythiophene (PEDOT), indium tin oxide (ITO), and metal films of tin, aluminum, iron, copper, gold, silver, nickel etc.

The anchoring agent is selected from thermo-sensitive or pressure-sensitive resins compatible with the material of the substrate film, for example, polymethyl methacrylate (PMMA), polycarbonate (PC), polystyrene, polyamide (PA), polyvinyl alcohol, and silicone. The anchoring agent is applied to the substrate film, for example, by gravure coating, roller coating, comma coating, gravure printing, screen printing, or offset printing.

Figure 3:
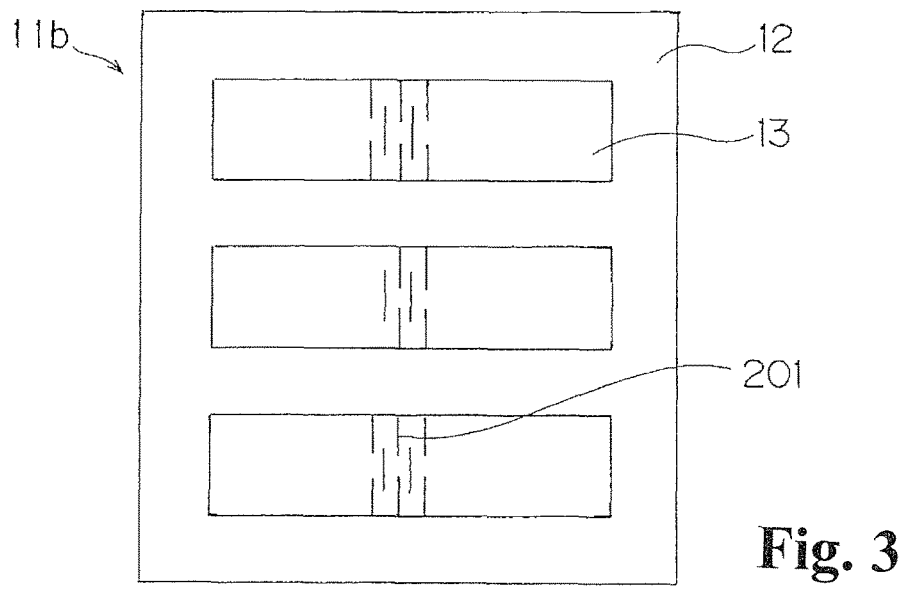
FIG. 3 is the plan view of a second conductive-electroded film.

FIG. 3 is the plan view of a second conductive-electroded film 11b. The second conductive-electroded film 11b is manufactured, in the same manner as that for the first conductive-electroded film 11a, by applying an anchoring agent on a substrate film and laying a conductive material on the anchoring agent to make a conductive electrode region 13. The conductive electrode region 13 in the second conductive-electroded film 11b contains slits 201 for making the thin layer of the conductive material discontinuous. The discontinuous parts containing the slits 201 control the breakage of the conductive electrode region. Other properties of the second conductive-electroded film 11b are the same as that of the first conductive-electroded film 11a.

The methods (1) and (2) mentioned below are the examples of the method of making a discontinuous part (by patterning) of a conductive material.

(1) Printing a pattern of a conductive material on a substrate by screen printing, gravure printing, relief printing, ink jet printing, thermal printing or thermal transfer printing with an ink, for example, an ink blended with fine particles of PEDOT.

(2) Applying a conductive material on a substrate and making holes or slits in the conductive material by etching with laser beam or photoresist. Metal nanowire, CNT, PEDOT or ITO can be employed for the electrode material in the method.

Figure 4A:
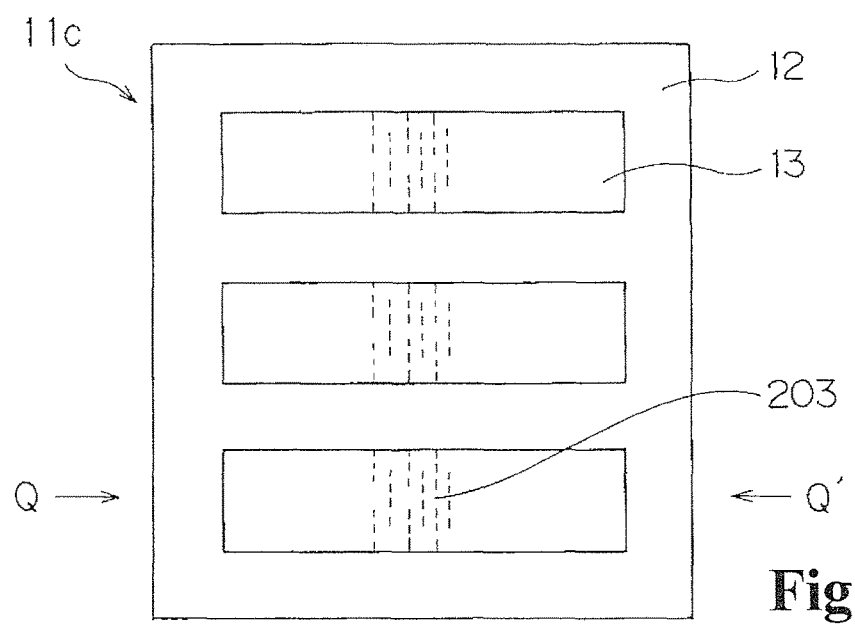
FIG. 4 is the illustrative diagram of a third conductive-electroded film.
Figure 4B:
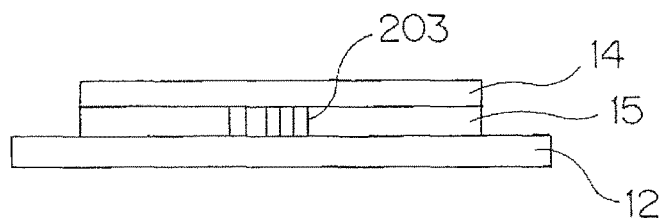

FIG. 4 is the illustrative diagram of a third conductive-electroded film. FIG. 4(a) is a plan view and FIG. 4(b) is a cross-sectional view taken along the plane indicated by the arrows Q and Q'. The third conductive-electroded film 11c is manufactured by applying an anchoring agent 15 on a substrate film 12 and laying a conductive material 14 on the anchoring agent 15 to make a conductive electrode region 13.

The anchoring agent 15 is patterned into three conductive electrode regions 13, each having slits 203 for making the thin layer of the anchoring agent 15 discontinuous. The parts having the slits 203 are the discontinuous parts for controlling the breakage of the conductive electrode region.

The third conductive-electroded film 11c shown in FIG. 4 has slits 203 in which the anchoring agent is absent. The layer of the anchoring agent made discontinuous can be explained as the discontinuous parts of the layer of the anchoring agent. In the present invention, the discontinuous parts of the layer of the anchoring agent can be formed by making voids in the layer, making spots at which the layer is thinner than other area of the layer, or making spots having different surface property from that of other area of the layer. The thinner layer spots made by varying the thickness of the layer of the anchoring agent have low bonding strength. The spots having different surface property imparted by an adhesion inhibitor exhibit low bonding strength or have no bonding performance.

The void or cut for making discontinuous parts of the layer of the anchoring agent 15 may be formed into holes without restriction to slits. The holes in the layer of the anchoring agent 15 may be covered with the layer of the conductive material completely or partially, or may not be covered with the conductive material at all. In the present invention, the conductive material may or may not cover the discontinuous part of the anchoring agent 15.

The anchoring agent 15 can be patterned by, for example, (1) applying the anchoring agent to the whole surface of a substrate and removing part of the anchoring agent by etching, or (2) printing techniques such as screen printing or gravure printing.

The parts having high or low effect of the anchoring agent can be alternately made on a substrate film by (1) laying an adhesion inhibitor on some parts of a layer of an anchoring agent applied to the whole surface of a substrate, or (2) patterning a layer of an anchoring agent into thick and thin layers by incomplete etching on the layer of the anchoring agent applied to the whole surface of a substrate.

The method of (2) patterning a layer of an anchoring agent into thick and thin layers is preferable, because the resultant touch panel has a touch surface looking similar to the background and indistinguishable, and can be fabricated at low cost owing to the use of only one anchoring agent.

The discontinuous parts of the layers of the conductive material and anchoring agent should be made with a common design concept as follows. Comparing slits and holes made in the discontinuous parts, slits are preferable for the discontinuous parts of a conductive electrode region mainly extended to one direction in shaped conductive-electroded film. In this case, the slits should be arranged perpendicular to the direction of the extension. Holes are preferable for the discontinuous parts of a conductive electrode region extended biaxially (in other words, extended to the directions of both X and Y axes which are perpendicular to each other). The shape of the holes include, for example, circle, square, rectangle, hexagon and octagon.

The outline of a conductive electrode region should overlap with part of the outline of slits or holes locating near the edge of the conductive electrode region, because the breakage of the conductive electrode region is led by the breakage at the outline of the slits or holes.

The forming material includes acrylic resin and polycarbonate.

The examples of the method of fabricating a curved touch panel by shaping a conductive-electroded film and combining the shaped film with a forming material include the following methods (1) to (3).

(1) Laminating a conductive-electroded film and a flat forming material, and shaping the laminate into a curved touch panel in a forming process, such as vacuum and pressure forming.

(2) Shaping a conductive-electroded film and flat forming material respectively into a curve, and bonding them to fabricate a curved touch panel.

(3) Shaping a conductive-electroded film set in a mold by injection molding to make into a curved tough panel. The conductive-electroded film may or may not be pre-formed before it is set in a mold.

Figure 5:
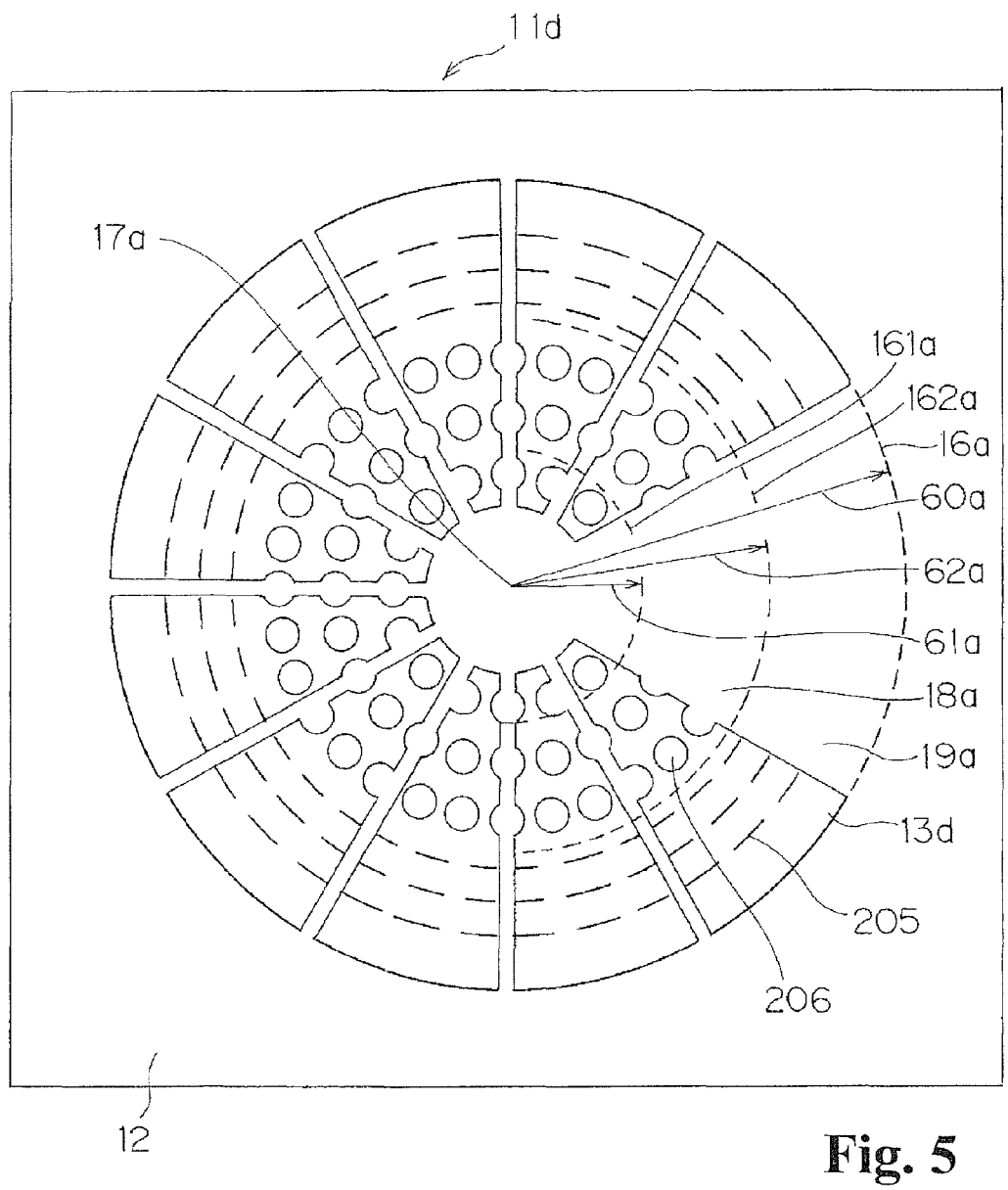
FIG. 5 is the plan view of a fourth conductive-electroded film.

FIG. 5 is the plan view of a fourth conductive-electroded film 11d. The fourth conductive-electroded film 11d is used in combination with a forming material for fabricating a touch panel, which has a three-dimensional shape consisting of a spherical cap 41 and a rim 42 attached thereto as mentioned in reference to FIG. 1.

The fourth conductive-electroded film 11d contains twelve conductive electrode regions 13d formed on a substrate film 12. Ten of the twelve conductive electrode regions 13d are shown in the figure while other two electrode regions are omitted.

The twelve conductive electrode regions 13d are circumscribed by a circle 16a. In other words, the circle 16a is the smallest of the circles surrounding the twelve conductive electrode regions 13d. The center C of the circumscribing circle 16a is indicated by the sign 17a and the radius R of the circle is indicated by the arrow 60a.

The conductive electrode regions 13d contain slits 205 and holes 206 formed in the conductive material. The slits 205 and holes 206 constitute the discontinuous parts.

The small annulus 18a and large annulus 19a are in the circumscribing circle 16a. The inner circumference of the small annulus 18a is the circle 161a having a radius ⅓ R (indicated by the arrow 61a) and the center C (indicated by the sign 17a), and the outer circumference of the small annulus 18a is the circle 162a having a radius ⅔ R (indicated by the arrow 62a) and the center C (indicated by the sign 17a).

The inner circumference of the large annulus 19a is the circle 162a having a radius ⅔ R (indicated by the arrow 62a) and the center C (indicated by the sign 17a), and the outer circumference of the large annulus 19a is the circle 16a having a radius R (indicated by the arrow 60a) and the center C (indicated by the sign 17a).

The conductive electrode regions included in the small annulus 18a contain the parts to be extended to the directions of both X and Y axes for fabricating the touch panel 1. Thus the parts are formed discontinuous by making holes.

The conductive electrode region 13d included in the large annulus 19a contain the parts to be extended to one direction parallel to the radiuses of the circles when the touch panel 1 is fabricated. The parts extended parallel to the radiuses of the circles are near the edge at which the rim extends, and are formed discontinuous by making slits. The slits can be described as linear cuts in a form of arcs of circles having the center C (indicated by the sign 17a). The arcs are perpendicular to the direction of extension of the discontinuous parts.

The discontinuous parts of the fourth conductive-electroded film 11d mentioned above are made in the layer of the conductive material. The discontinuous parts may be made in the layer of the anchoring agent by making holes in the layer of the anchoring agent of the conductive electrode region 13d included in the small annulus 18a, or by making slits in the layer of the anchoring agent of the conductive electrode region 13d included in the large annulus 19a.

In FIG. 5, the circles 16a, 161a and 162a are drawn in broken line, and the parts of them are omitted.

Figure 6:
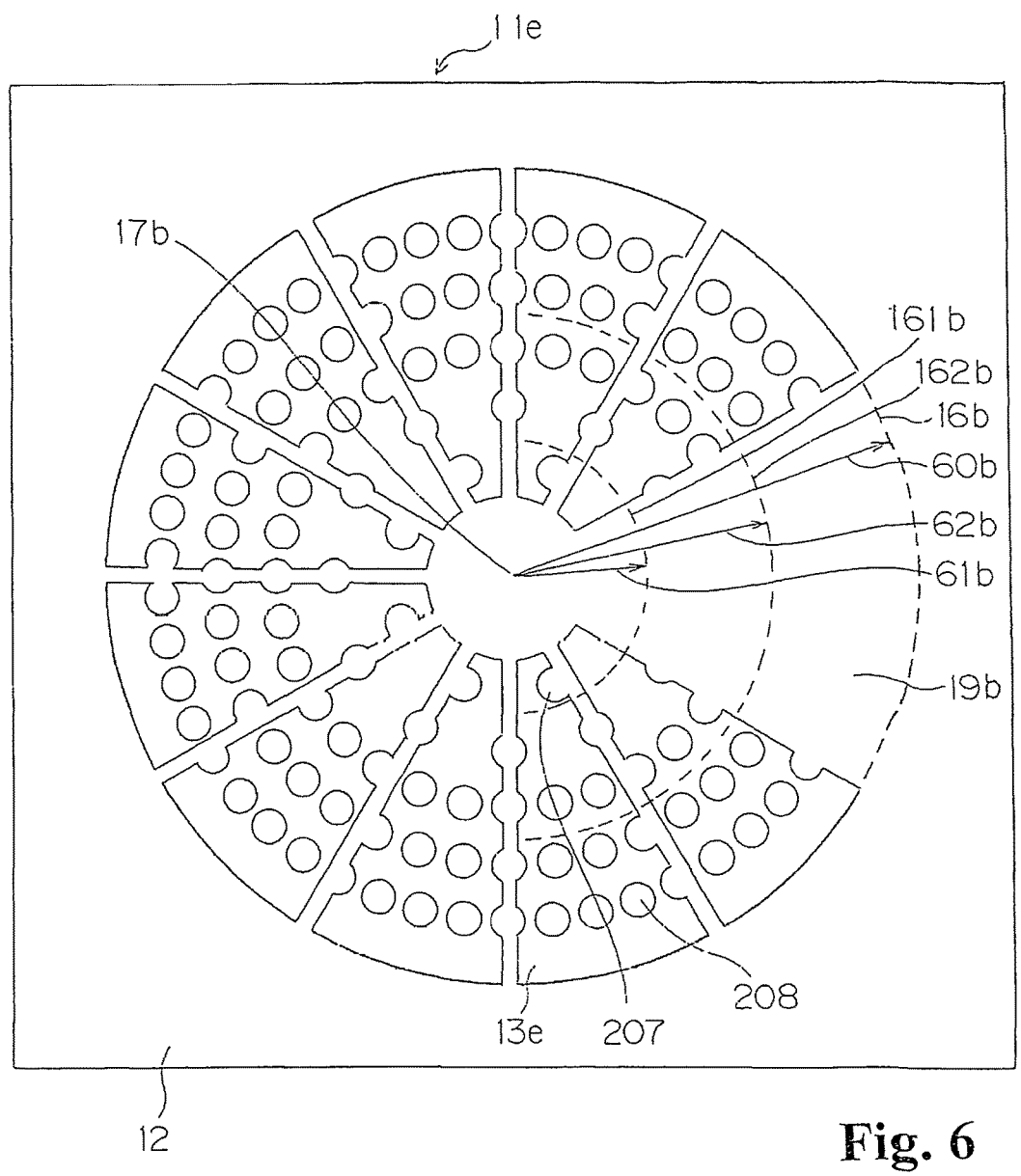
FIG. 6 is the plan view of a fifth conductive-electroded film.

FIG. 6 is the plan view of a fifth conductive-electroded film 11e. The fifth conductive-electroded film 11e is used in combination with a forming agent for fabricating a touch panel, which has a three-dimensional shape consisting of a spherical cap 41 and a rim 42 attached thereto as mentioned in reference to FIG. 1.

The fifth conductive-electroded film 11e contains twelve conductive electrode regions 13e formed on a substrate film 12. Ten of the twelve conductive electrode regions 13e are shown in the figure while other two electrode regions are omitted.

The twelve conductive electrode regions 13e are circumscribed by a circle 16b. In other words, the circle 16b is the smallest of the circles surrounding the twelve conductive electrode regions 13e. The center C of the circumscribing circle 16b is indicated by the sign 17b and the radius R of the circle is indicated by the arrow 60b.

The conductive electrode regions 13e contain holes 207 and holes 208 formed in the conductive material. The holes 207 and holes 208 constitute the discontinuous parts.

The small circle 161b and large annulus 19b are in the circumscribing circle 16b. The small circle 161b has a radius ⅓ R (indicated by the arrow 61b) and the center C (indicated by the sign 17b). The inner circumference of the large annulus 19b is the circle 162b having a radius ⅔ R (indicated by the arrow 62b) and the center C (indicated by the sign 17b), and the outer circumference of the large annulus 19b is the circle 16b having a radius R (indicated by the arrow 60a) and the center C (indicated by the sign 17b).

Comparing the extension of the parts in the conductive electrode region 13e in fabricating a touch panel 1, the parts included in the small circle 161b are extended slightly, while the parts included in the large annulus 19b are extended greatly.

The area of the discontinuous part (holes 207) per a unit area of the conductive electrode region 13e included in the small circle 161b, which is represented by NCA-S, and the area of the discontinuous part (holes 208) per a unit area of the conductive electrode region 13e included in the large annulus 19b, which is represented by NCA-L, satisfy the following expression (1).

$$NCA-S < NCS-L \quad (1)$$

The discontinuous parts of the fifth conductive-electroded film lie mentioned above are made in the layer of the conductive material. The discontinuous parts may be made in the layer of an anchoring agent by making holes in the layer of the anchoring agent of the conductive electrode region 13e included in the small circle 161b or by making holes in the layer of the anchoring agent of the conductive electrode region 13e included in the large annulus 19b.

Furthermore, slits may be made in the layer of the conductive material or anchoring agent instead of holes.

In FIG. 6, the circles 16b, 161b and 162b are drawn in broken line, and parts of them are omitted.

INDUSTRIAL APPLICABILITY

The touch panel provided by the present invention can be fabricated into a capacitive touch panel in combination with, for example, an oscillation circuit and comparator circuit.

REFERENCE SIGNS LIST

1 Touch panel
2 Touch surface
3 Shaped part
11 Conductive-electroded film
12 Substrate film
13 Conductive electrode region
14 Conductive material
15 Anchoring agent
16 Circle circumscribing conductive electrode region
17 Center
18 Small annulus
18 Large annulus
20 Discontinuous part
41 Spherical cap
42 Rim
43 Base
50 Points on both sides of shaped part
201 Slits formed in conductive material
202 Holes formed in conductive material
203 Slits formed in anchoring agent

The invention claimed is:

1. A method of fabricating a touch panel, comprising the steps of:
preparing a forming material and a conductive-electroded film formed with a conductive electrode region constituting a touch surface on a substrate film, and
deforming the conductive-electroded film and integrating with the forming material to fabricate the touch panel with a curved touch surface,
wherein the conductive-electroded film including a first discontinuous part for controlling a breakage of the conductive electrode region is used as the conductive-electroded film so that during a deformation of the conductive-electroded film, the breakage occurs at one portion of a deformed part of the conductive electrode region and the conductive electrode region retains conductivity at two points sandwiching the deformed part therebetween,
the touch panel has a three-dimensional shape of a spherical cap or hemisphere with a rim extending outwardly from a bottom face of the spherical cap or hemisphere;
the conductive electrode region on the conductive-electroded film is formed within a circumscribing circle circumscribed to the conductive electrode region,
in a case in which a radius and a center of the circumscribing circle are defined as R and C respectively, the first discontinuous part is formed by making holes in a portion of the conductive electrode region disposed inside a first annulus having the center C, a first inner periphery being a first circle with a radius ⅓ R, and a first outer periphery being a second circle with a radius ⅔ R, and
a second discontinuous part is formed by forming lines in a portion of the conductive electrode region disposed inside a second annulus having the center C, a second inner periphery being a third circle with a radius ⅔ R, and a second outer periphery being a fourth circle with a radius R; and the lines forming the second discontinuous part are an arc of circles having the center C.

2. A conductive-electroded film integrally formed with a forming material for forming a touch panel having a curved touch surface, comprising:
a substrate film having a conductive electrode region constituting a touch surface of the touch panel,
wherein the conductive electrode region in the conductive-electroded film comprises a first discontinuous part for controlling a breakage of the conductive electrode region so that during a deformation, the breakage occurs at one portion of a deformed part of the conductive electrode region and the conductive electrode region retains conductivity at two points sandwiching the deformed part therebetween, the touch panel has a three-dimensional shape of a spherical cap or hemisphere with a rim extending outwardly from a bottom face of the spherical cap or hemisphere;

the conductive electrode region on the conductive-electroded film is formed within a circumscribing circle circumscribed to the conductive electrode region, in a case in which a radius and a center of the circumscribing circle are defined as R and C respectively, the first discontinuous part comprises holes in a portion of the conductive electrode region disposed inside a first annulus having the center C, a first inner periphery being a first circle with a radius ⅓ R, and a first outer periphery being a second circle with a radius ⅔ R; and a second discontinuous part comprises lines in a portion of the conductive electrode region disposed inside a second annulus having the center C, a second inner periphery being a third circle with a radius ⅔ R, and a second outer periphery being a fourth circle with the radius R; and the lines forming the second discontinuous part are an arc of circles having the center C.

3. A conductive-electroded film integrally formed with a forming material for forming a touch panel having a curved touch surface, comprising:

a substrate film having a conductive electrode region constituting a touch surface of the touch panel, wherein the conductive electrode region in the conductive-electroded film comprises a first discontinuous part for controlling a breakage of the conductive electrode region so that during a deformation, the breakage occurs at one portion of a deformed part of the conductive electrode region and the conductive electrode region retains conductivity at two points sandwiching the deformed part therebetween, the touch panel having a three-dimensional shape of a spherical cap or hemisphere with a rim extending outwardly from a bottom face of the spherical cap or hemisphere;

the conductive electrode region on the conductive-electroded film is formed within a circumscribing circle circumscribed to the conductive electrode region, in a case in which a radius and a center of the circumscribing circle are defined as R and C respectively, an area of the first discontinuous part per unit area of the conductive electrode region in a portion disposed inside a first circle with the center C and a first inner periphery being a radius ⅓ R is defined as NCA-S, and in a case in which the area of the first discontinuous part per unit area of the conductive electrode region in a portion disposed inside an annulus having the center C, a second inner periphery being a second circle having a radius ⅔ R, and an outer periphery being a third circle having the radius R is defined as NCA-L, the equation NCA-S is less than NCS-L is satisfied.

* * * * *